US006366838B1

(12) United States Patent
Yoshino et al.

(10) Patent No.: US 6,366,838 B1
(45) Date of Patent: Apr. 2, 2002

(54) VEHICLE CONTROL DEVICE

(75) Inventors: Takahiro Yoshino, Yokosuka; Yuki Nakajima, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/764,069

(22) Filed: Jan. 19, 2001

(30) Foreign Application Priority Data

Jan. 20, 2000 (JP) ........................................ 2000-011686

(51) Int. Cl.[7] ................................................. B60K 1/00
(52) U.S. Cl. ........................................ 701/22; 318/139
(58) Field of Search .......................... 701/22; 318/139; 307/9.1, 10.7; 320/104; 324/378

(56) References Cited

U.S. PATENT DOCUMENTS

| 4,031,407 | A | * | 6/1977 | Reed .............................. 307/87 |
| 4,444,173 | A | * | 4/1984 | Yamato et al. ................ 123/491 |
| 4,503,829 | A | * | 3/1985 | Hasegawa et al. ............ 123/492 |
| 5,140,960 | A | * | 8/1992 | Fujimoto et al. ............. 290/40 C |
| 5,345,154 | A | * | 9/1994 | King ............................. 318/49 |
| 6,037,728 | A | * | 3/2000 | Petkovic ....................... 318/364 |
| 6,118,237 | A | * | 9/2000 | Kikuchi et al. ............... 318/139 |
| 6,150,793 | A | * | 11/2000 | Lesesky et al. ............... 320/104 |
| 6,205,379 | B1 | * | 3/2001 | Morisawa et al. ............. 701/22 |
| 6,223,106 | B1 | * | 4/2001 | Yano et al. .................... 701/22 |

* cited by examiner

Primary Examiner—William A. Cuchlinski, Jr.
Assistant Examiner—Olga Hernandez
(74) Attorney, Agent, or Firm—Foley & Lardner

(57) ABSTRACT

The output of an engine is recovered by a generator. A motor is driven by the electric power generated by the generator. When there is a sudden acceleration, etc., the generation power output by the generator is delayed, and when the electric power supplied to the motor is insufficient, the insufficient part is supplied from a battery. The maximum power output of the battery decreases according to battery temperature. However, as the response of the generation power output of the generator is increased if battery temperature is low, the above-mentioned insufficient part is always suppressed below the maximum power output of the battery. In this way, the inability of the battery to supply electric power required for acceleration is prevented, and thus the problem of poor acceleration is eliminated.

9 Claims, 7 Drawing Sheets

VEHICLE CONTROL DEVICE

FIELD OF THE INVENTION

The present invention relates to a control device for a vehicle equipped with an engine, a motor and a generator.

BACKGROUND OF THE INVENTION

In recent years, the use of hybrid vehicles equipped with an engine, a motor and a generator is becoming more common due to demand for low pollution, longer travel range and an infrastructure for energy supply. The parallel hybrid vehicle (referred to hereafter as PHEV) which is already in practical use main runs on the engine, and increases fuel cost-performance by assisting the driving force by the motor using the power recovered during deceleration, etc.

On the other hand, there is also a series hybrid vehicle (referred to hereafter as SHEV) which aims at much higher efficiency. In an SHEV, the vehicle is driven only by the motor and the engine is used only for driving a generator. The SHEV as conventionally proposed makes the enhancement of efficiency its primary goal, so the engine is operated under certain fixed conditions for which fuel-cost performance is optimized.

However, in such a SHEV, as it is necessary to vary the running state of a vehicle without changing the driving state of the engine, a battery of sufficient capacity is needed, and an increase of weight and cost cannot be avoided.

SUMMARY OF THE INVENTION

The inventors therefore proposed a hybrid vehicle having the same mechanical structure as a SHEV, i.e., an engine, a motor and a generator, wherein the power consumed by the motor for vehicle running is computed at every instant, and the engine and generator are controlled to generate sufficient power for this. If the power consumed by the motor and the power generated by the generator are in agreement, only a minimum capacity is required, the battery which is a factor leading to increased weight and cost can be made compact, and costs can be suppressed. To increase efficiency of the engine in such a vehicle, it is preferable to operate the engine at relatively low rotation speed and high load.

However, if the engine is operated at low rotation speed and high load, as the margin of the engine torque (=maximum engine torque−current engine torque) becomes small, the response of the engine and the generator declines, and a situation may occur wherein the electric power which the motor needs for sudden acceleration of the vehicle, and sharp increase of auxiliary machinery load, cannot be supplied to the motor from the generator.

In such a situation, good operability can be realized without losing acceleration response if the insufficient electric power can be covered by the electric power supplied from the battery. However, if the battery temperature is low, there will be little electric power which can be supplied from the battery, the electric power required for the above-mentioned acceleration will not be forthcoming, and poor acceleration will result.

It is therefore an object of this invention to ensure electric power required for acceleration can be supplied from a battery and ensure good acceleration response when the temperature of the battery is low.

In order to achieve above object, this invention provides a control device for a vehicle, wherein the vehicle comprises an engine, a generator which rotates in synchronism with the engine, and regenerates the output of the engine, a motor driven by the electric power regenerated by the generator, and an electric energy storage device which supplies electric power to the motor, wherein when the electric power supplied to the motor from the generator is insufficient due to response delay of the generation power output from the generator, the electric power to cover the insufficient amount is supplied to the motor from the electric energy storage device, and the control device comprises a sensor which detects the temperature of the electric energy storage device, and a microprocessor programmed to enhance the response of the generation power output of the generator according to the decline of the temperature of the electric energy storage device.

According to an aspect of this invention, a control device for a vehicle is provided, wherein the vehicle comprises an engine, a generator mechanically connected to the engine, a motor electrically connected to the generator, and mechanically connected to the drive shaft of the vehicle, and an electric energy storage device electrically connected to the generator and motor, and the control device comprises a first sensor which detects the running conditions of the vehicle, a second sensor which detects the temperature of the electric energy storage device, and a microprocessor programmed to compute a target motor output based on the running conditions of the vehicle, the target motor output expressing the output of the motor for driving the vehicle according to the running conditions, compute a target engine output based on the target motor output, the target engine output expressing the output of the engine for causing the generator to generate electric power according to the target motor output, compute a first target rotation speed of the generator based on the target engine output, the first target rotation speed expressing the rotation speed of the generator for making the output of the engine coincide with the target engine output at an optimum fuel cost-performance, compute a second target rotation speed of the generator based on the target engine output and the temperature of the electric energy storage device, the second target rotation speed expressing the rotation speed of the generator which makes the output of the engine coincide with the target engine output, and makes the torque margin of the engine a value according to the temperature of the electric energy storage device, select one of the first target rotation speed and second target rotation speed as a third target rotation speed, and control the rotation speed of the generator based on the third target rotation speed.

The details as well as other features and advantages of this invention are set forth in the remainder of the specification and are shown in the accompanying drawings.

DESCRIPTION OF PREFERRED EMBODIMENTS

Figure 1:
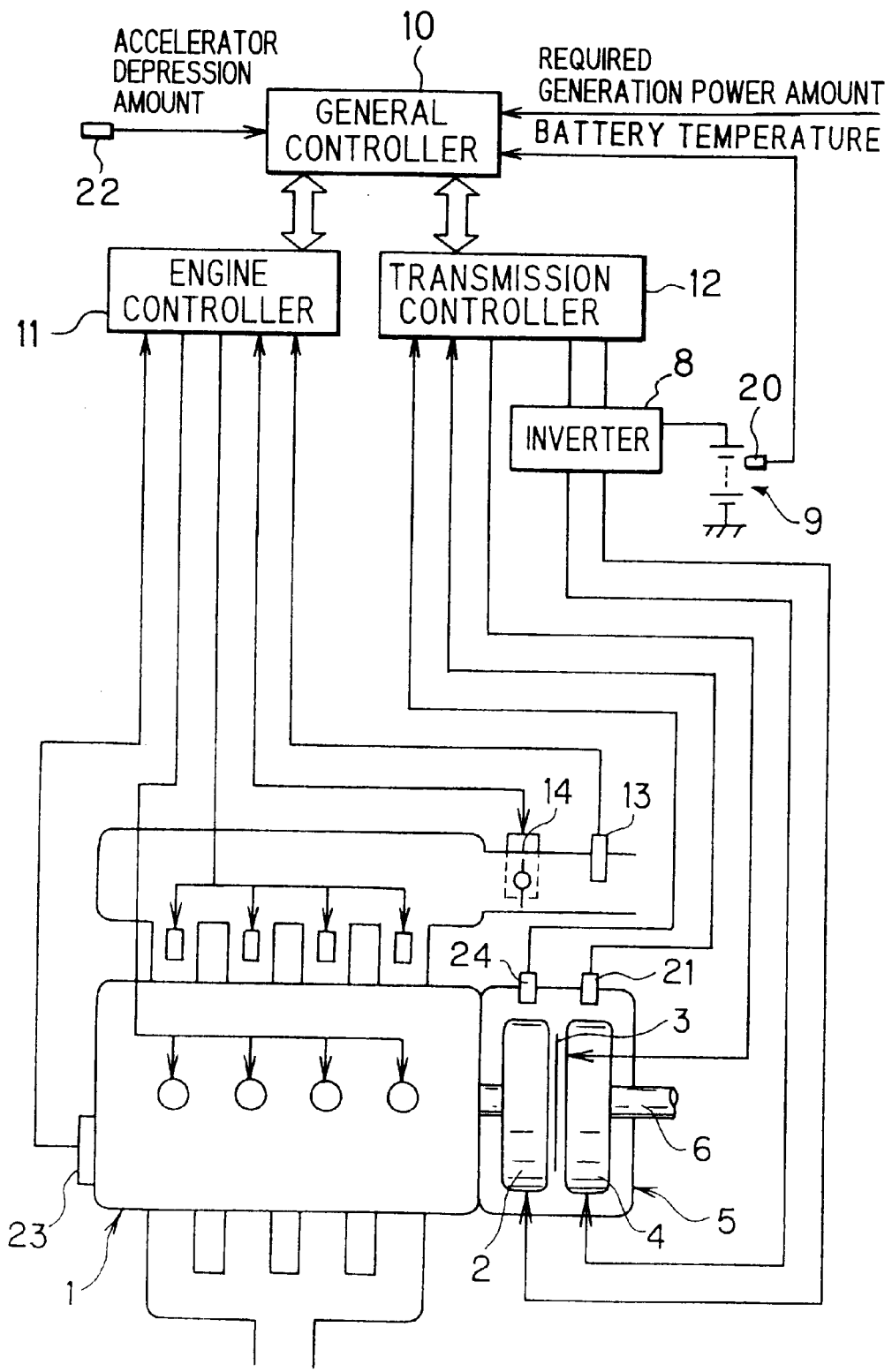
FIG. 1 is a schematic diagram of a vehicle equipped with a control device according to this invention.

Referring to FIG. 1 of the drawings, a vehicle to which the control device relating to this invention is applied, is equipped with an electrical transmission 5 which functions as a continuously variable transmission. The electrical transmission 5 comprises a generator 2 and a motor 4. The generator 2 on the input side is connected to the crankshaft of an engine 1, and the motor 4 on the output side is connected to a drive shaft 6 of the vehicle.

The generator 2 and motor 4 are an A.C. machine, such as a permanent magnet type alternating current synchronous motor, and are connected to an inverter 8, respectively. A battery 9 functioning as an electric power storage device is connected to the inverter 8. A temperature TEMPB of the battery 9 is detected by a battery temperature sensor 20. A capacitor may be used instead of the battery 9.

The output of the engine 1 is regenerated by the generator 2. The motor 4 is driven by the regenerated electric power. The electric power consumption of the motor 4 are basically met by the electric power supplied from the generator 2, and electric power is supplied to the motor 4 from the battery 9 if the electric power supply to the motor 4 from the generator 2 is insufficient due to the response delay of the generation power output, mentioned later.

A clutch 3 is interposed between the generator 2 and motor 4. When the clutch 3 is engaged, the engine 1 and drive shaft 6 are linked directly, and the drive wheels are directly driven by the output of the engine 1. The clutch 3 is engaged when the input rotation speed and output rotation speed of the electrical transmission 5 are equal. If the clutch 3 is engaged, losses in the generator 2 and motor 4 are suppressed, and the fuel-cost performance of the vehicle can be enhanced.

The electrical transmission 5 is provided with an input rotation speed sensor 24 for detecting the rotation speed of a rotor of the generator 2 and an output rotation speed sensor 21 for detecting the rotation speed of a rotor of the motor 4. The rotor of the generator 2 is mechanically connected to the engine 1 and the rotor of the motor 4 is mechanically connected to the drive shaft 6. The rotation speed detected by these sensors 21, 24 is input into a transmission controller 12. As the engine 1 and the generator 2 are directly connected, the input rotation speed of the electrical transmission 5 is equal to the rotation speed of the engine 1.

The engine 1 is equipped with an electronic control throttle 14. The opening of the throttle 14 is controlled according to the accelerator depression amount APS detected by an accelerator depression amount sensor 22. The intake air amount of the engine 1, the throttle opening and the rotation speed are detected by an air flow meter 13, throttle opening sensor 14 and crank angle sensor 23, respectively, and these detected signals are input into an engine controller 11.

A general controller 10 calculates a target output torque tTo of the motor 4 so that a driving power output according to the accelerator depression amount APS may be obtained. An operating point of the engine 1 and the motor 2, i.e., the target input rotation speed tNi of the motor 2 and the target torque tTe of the engine 1, are calculated so that a generation power output corresponding to the driving power output (=electric power consumption) of the motor 4 may be obtained, and the general controller 10 outputs them to controllers 11 and 12.

Although generation power output is delayed relative to the driving power output when the vehicle performs sudden acceleration and auxiliary machinery load increases suddenly, the accompanying shortage of electric power is supplied from the battery 9, and good acceleration performance is assured.

When the battery temperature TEMPB is low, and when the electric power which the battery 9 can output declines, the shortage of electric power due to the response delay of the generation power output may exceed the maximum power output of the battery 9. Thus, in the control device relating to this invention, the generation power output response of the generator 2 is enhanced to prevent this.

Specifically, the operating points of the engine 1 and the generator 2 are shifted to the high rotation speed and low torque side, the margin of the engine torque increases, and the generation power output response of the generator 2 is enhanced as the battery temperature TEMPB becomes lower (described in detail later).

The transmission controller 12 controls the torque of the motor 4 and the rotation speed of the generator 2 so that the target output torque tTo and the target input rotation speed tNi calculated by the general controller 10 are realized. The engine controller 11 controls the torque of the engine 1 so that the target engine torque tTe calculated by the general controller 10 is realized.

Figure 2:
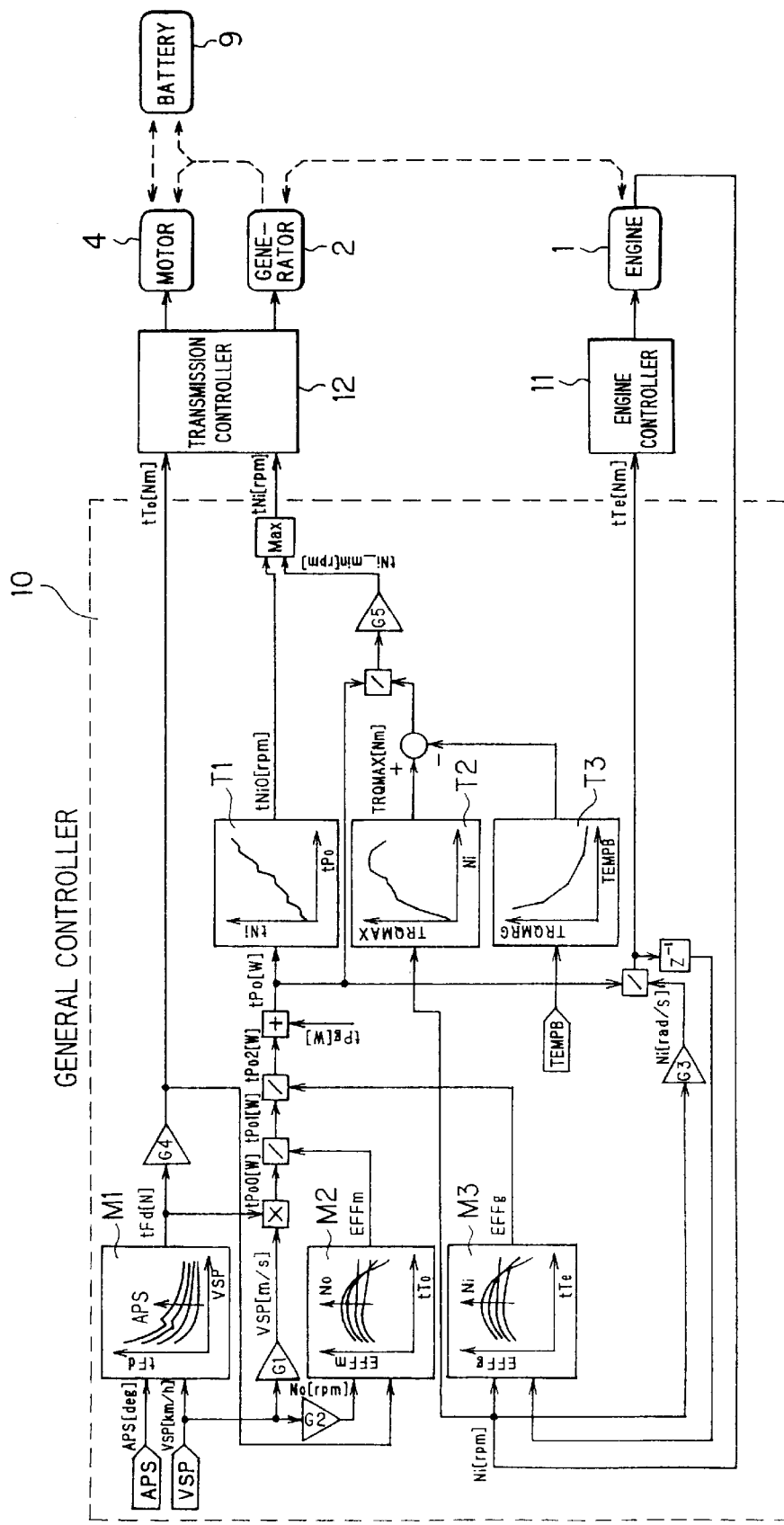
FIG. 2 is a control block diagram of a general controller.

FIG. 2 is a block diagram showing the control performed by the general controller 10. The details of this control will be described referring to this.

First, based on the accelerator depression amount APS and the vehicle speed VSP, a target driving force tFd is calculated with reference to a map M1. The vehicle speed VSP is computed by multiplying the output rotation speed No by the final reduction ratio of the differential gear unit and the radius of the drive wheels, etc.

The target output torque tTo is calculated by multiplying the target driving force tFd by a constant G4=(tyre effective radius)/(final gear ratio). The target output torque tTo is transmitted to the transmission controller 12.

The unit of the vehicle speed VSP [km/hour] is converted into [m/ second] units by multiplying by a constant G1=1000/3600, and a target motor output tPo0 [W] is calculated by multiplying the values after conversion by the target drive force tFd [N]. Next, the target motor output tPoO is divided by a motor efficiency EFFm obtained by looking up a map M2, and the motor demand electric power tPo1 [W] is calculated. If an electric power tPo1 is supplied to the motor 4, the output of the motor 4 will be tPo0. This control device is based on the idea that the power consumed by the motor is covered by the generation power output of the generator, so the motor demand electric power tpo1 expresses the target generation power output of the generator 2. Next, the motor demand electric power tPo1 (=target generation power output) is divided by the generator efficiency EFFg obtained by looking up a map M3, and the generator demand driving power tPo2 [W] is calculated. If the generator is driven at a power of tPo2, the generation power output of the generator will be tPo1. As the engine 1 drives the motor 4, the generator demand driving power tPo2 expresses the target output of the engine 1. Finally, a required generation power amount tPg from vehicle-mounted components is added, and the final target engine output tPo is calculated.

The target input rotation speed tNiO is computed from the target engine output tPo by looking up a table T1. The table T1 is set so that the rotation speed at which the efficiency of the engine 1 and the generator 2 are maximized, is chosen.

A maximum torque TRQMAX of the engine 1 is calculated from the present input rotation speed (=engine speed) Ni by looking up a table T2. A minimum torque margin TRQMR based on the battery temperature TEMPB is then calculated by looking up a table T3. If the electronic control throttle 14 is controlled so that the intake air amount is a maximum when running under an arbitrary condition (engine torque, rotation speed), the torque generated by the engine 1 increases from the engine torque before control to the maximum torque for the rotation speed at that time in an instant. This increase width is the margin of engine torque under the running conditions. If the engine 1 is operated under the condition of large torque margin, the response of the real engine output relative to the increase in the target engine output tPo will be enhanced, and the generation power output response will also be increased. The minimum torque margin TRQMRG expresses the minimum torque margin required to make the electric power shortage due to the response delay of the generation power output less than the maximum power output of the battery 9. The minimum torque margin TRQMRG is set to be larger the lower the battery temperature TEMPB.

The difference of maximum torque TRQMAX and the minimum torque margin TRQMRG is computed, then the target engine output tPo is divided by this difference and multiplied by the constant G5 to perform unit conversion, and the minimum value tNi_min of the target input rotation speed is computed. The minimum value tNi_min is the minimum value of the rotation speed of the engine 1 and generator 2 required to realize the generation power response which suppresses the electric power shortage due to the response delay of the power output to below the maximum battery power output.

The larger of the target input rotation speed tNiO and the minimum value tNi_min is set to the final target input rotation speed tNi so that the rotation speed of the engine 1 and generator 2 is always larger than the minimum value tNi_min.

The final target input rotation speed tNi calculated as mentioned above is transmitted to the transmission controller 12, and rotation speed feedback control is performed by general proportional plus integral control (PI control) so that the rotation speed of the motor 2 is the final target input rotation speed tNi.

The target engine output tPo is divided by the engine speed (=input rotation speed Ni) to give the target engine torque tTe, and is transmitted to the engine controller 11. The engine controller 11 controls the torque of the engine 1 so that the target engine torque tTe is realized.

Next, the overall operation will be described.

In a vehicle to which the above-mentioned control device is applied, the torque of the motor 4 is controlled so that a drive force according to the accelerator depression amount APS and vehicle speed VSP are obtained. The operating point (the target input rotation speed tNi and target output torque tTe) of the engine 1 and the motor 2 is controlled so that the generation power output corresponding to the drive output (demand) of the motor 4 is obtained.

When there is a sudden acceleration, etc., the generation power output response of the generator 2 to the driving power output of the motor 4 is delayed, and when the electric power supplied to the motor 4 from the generator 2 is insufficient, the electric power shortage is covered by the electric power supplied from the battery 9.

Figure 3:
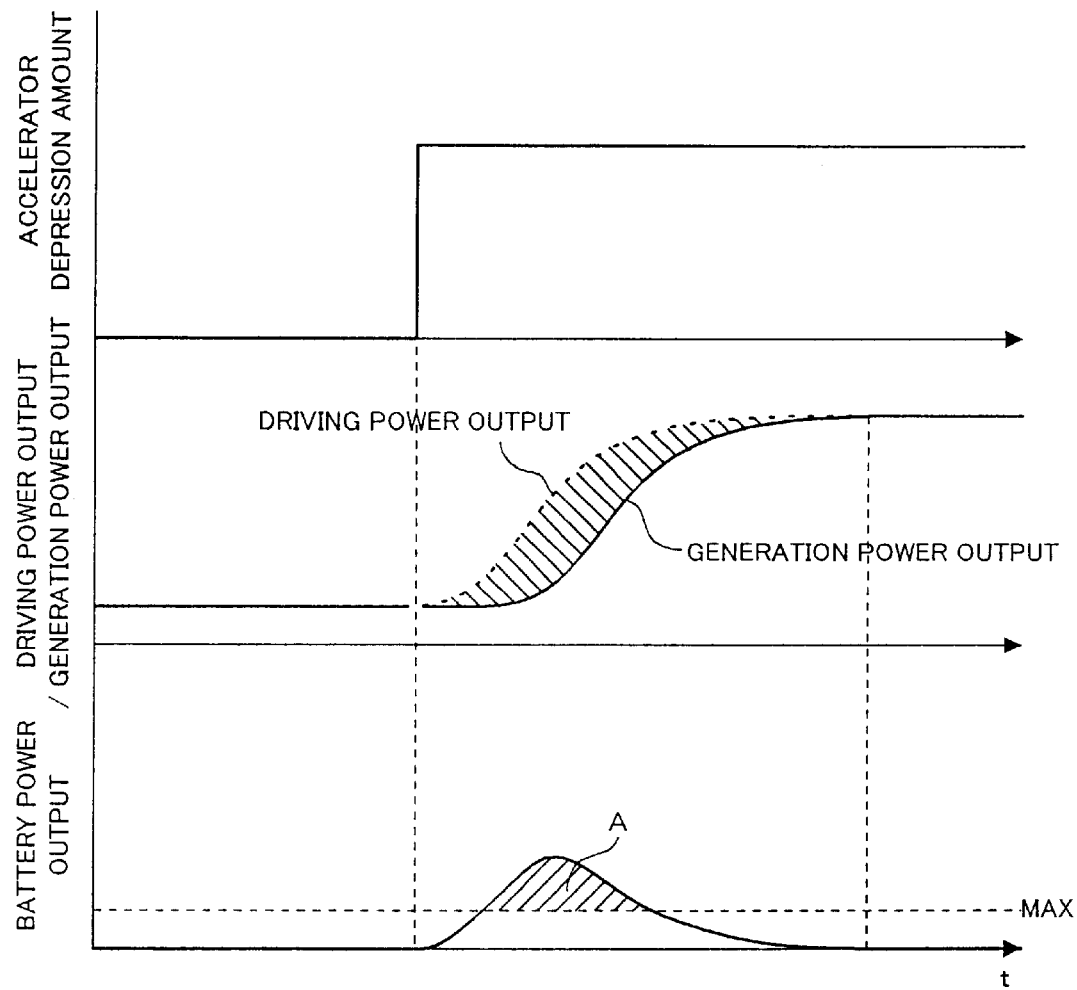
FIG. 3 shows how driving power output, generation power output and battery power output vary when accelerator depression amount is varied in stepwise manner (not applying this invention).

However, if the electric power shortage exceeds the maximum power output of the battery 9, the electric power which can be supplied to the motor 4 is insufficient, the electric power available to drive the vehicle will be reduced, and acceleration response will decline. FIG. 3 shows a situation (e.g., during rapid acceleration) where the accelerator depression amount varies in a stepwise manner, when the electric power shortage due to response delay of the generation power output exceeds the maximum power output of the battery 9. In this case, as an electric power equivalent to A in the figure is not supplied to the motor 4, poor acceleration results.

Usually, the generation power output response cannot be enhanced more than a predetermined response determined by the engine torque and its response, further determined by the response of the rotation speed and rotation speed control of the generator 2, and the generation power output response decreases the smaller the margin of the engine torque becomes. In particular, when the engine is operated with better fuel-cost performance, the engine 1 is operated at lower rotation speed and higher load even for the same required output, the margin of engine torque becomes small, the generation power response is still lower and the electric power supply tends to be insufficient Further, as the maximum power output of the battery 9 declines when battery temperature is low, the electric power supplied to the motor 4 easily tends to be insufficient As the response of the driving power output of the motor 4 has a large effect on drivability, if the electric supply power to the motor 4 is insufficient, it may give the driver an uncomfortable feeling.

In order to make the electric power shortage due to the response delay of generation power output less than the electric power which can be supplied by the battery 9, the response of the generation power output of the generator 2 must be enhanced, and electric power shortage must be suppressed. In order to increase the generation power output response, the margin of the engine torque must be increased.

Thus, in the control device relating to this invention, the temperature of the battery 9 is detected, the operating point of the engine 1 and the motor 2 is shifted to the high rotation speed and low torque side while maintaining the same output, and the margin of engine torque is increased.

In the block diagram shown in FIG. 2, the minimum value tNi_min of the target rotation speed required to assure the above-mentioned margin of engine torque is computed, and if the input rotation speed tNiO set to obtain the maximum running efficiency of the engine 1 and generator 2 is less than this, the final input rotation speed tNi is set to tNi_min regardless of the target input rotation speed tNi0 so that the required margin of engine torque is always ensured.

Figure 4:
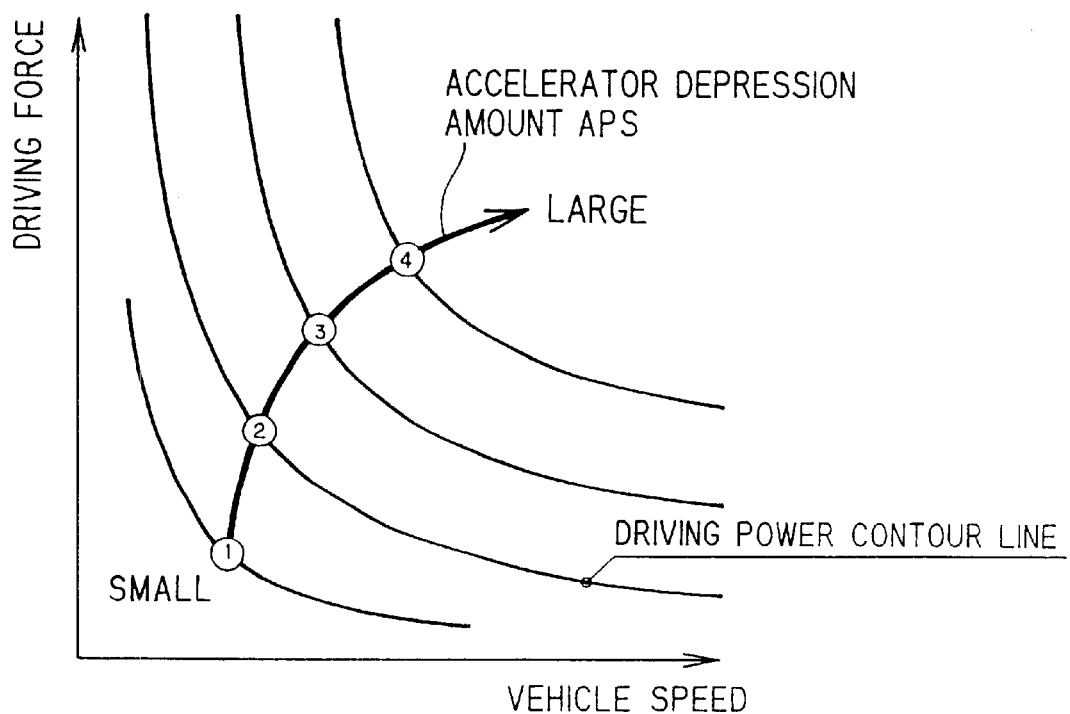
FIG. 4 shows how the operating point of the motor varies when accelerator depression amount is increased.
Figure 5:
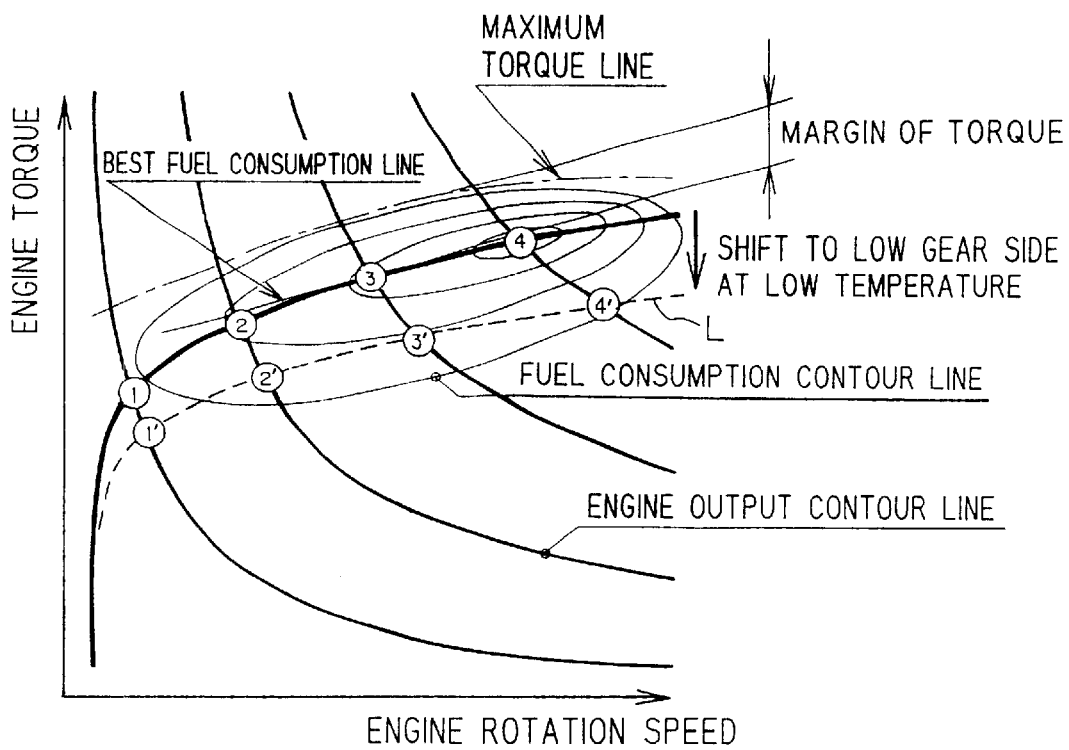
FIG. 5 shows how the engine and generator operating points vary at low battery temperature.

Hence, when for example the operating amount of the accelerator pedal increases, the driving power output of the motor increases as shown in FIG. 4 and the battery temperature is low, the operating point of the engine 1 and the generator 2 is shifted to the high rotation speed and low torque side while maintaining the same output, i.e., the low gear side of the speed ratio of the transmission 5 as shown in FIG. 5, and the margin of the engine torque is increased as shown by the broken line L in FIG. 5.

Figure 6:
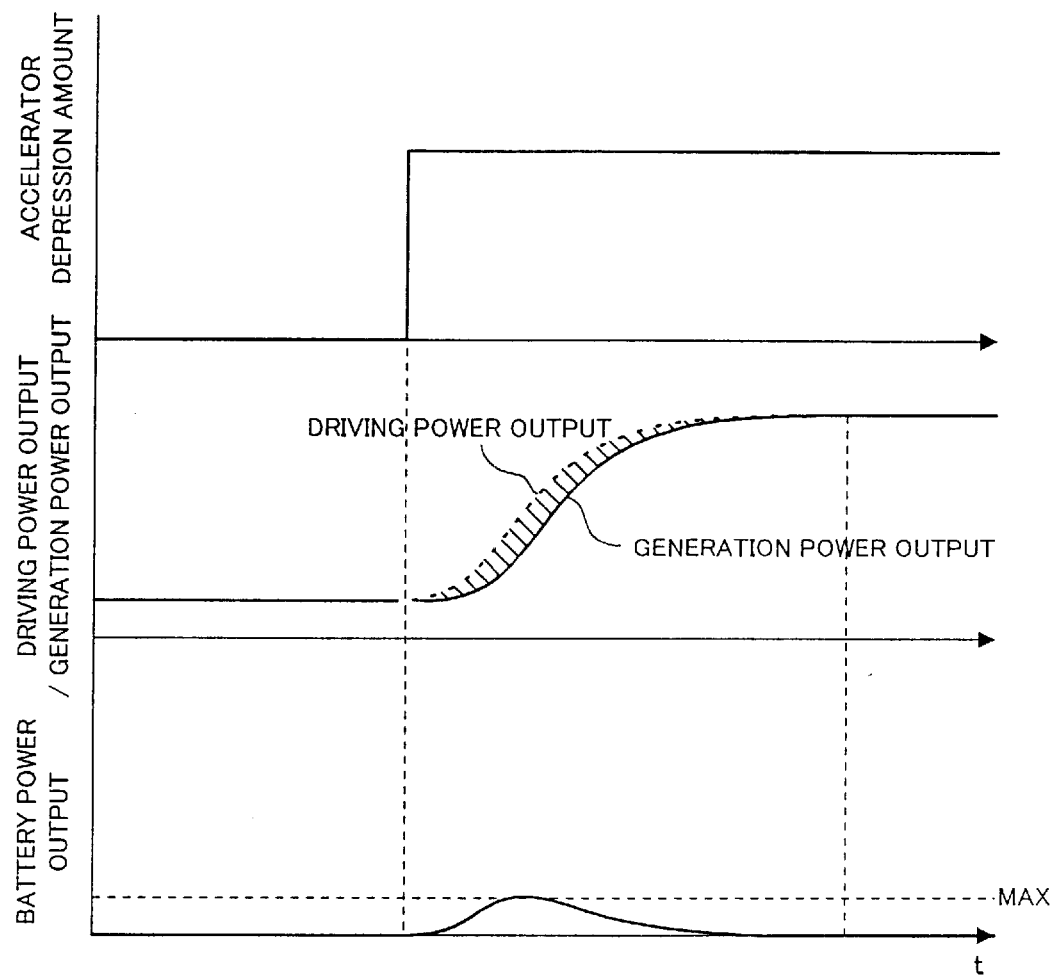
FIG. 6 shows how driving power output, generation power output and battery power output vary when accelerator depression amount is varied in stepwise manner (applying this invention).

When the margin of engine torque is increased, the generation power output response is enhanced, so insufficient electric power due to the response delay of generation power output is suppressed to below maximum power output of the battery 9 even if the accelerator depression amount varies in stepwise fashion, as shown in FIG. 6. Therefore, poor acceleration due to inability to supply the electric power required for acceleration from the battery 9, is eliminated.

Next, a second embodiment will be described. The construction of the vehicle is identical to that shown in FIG. 1. The processing in the general controller 10 however differs from that of the first embodiment.

Figure 7:
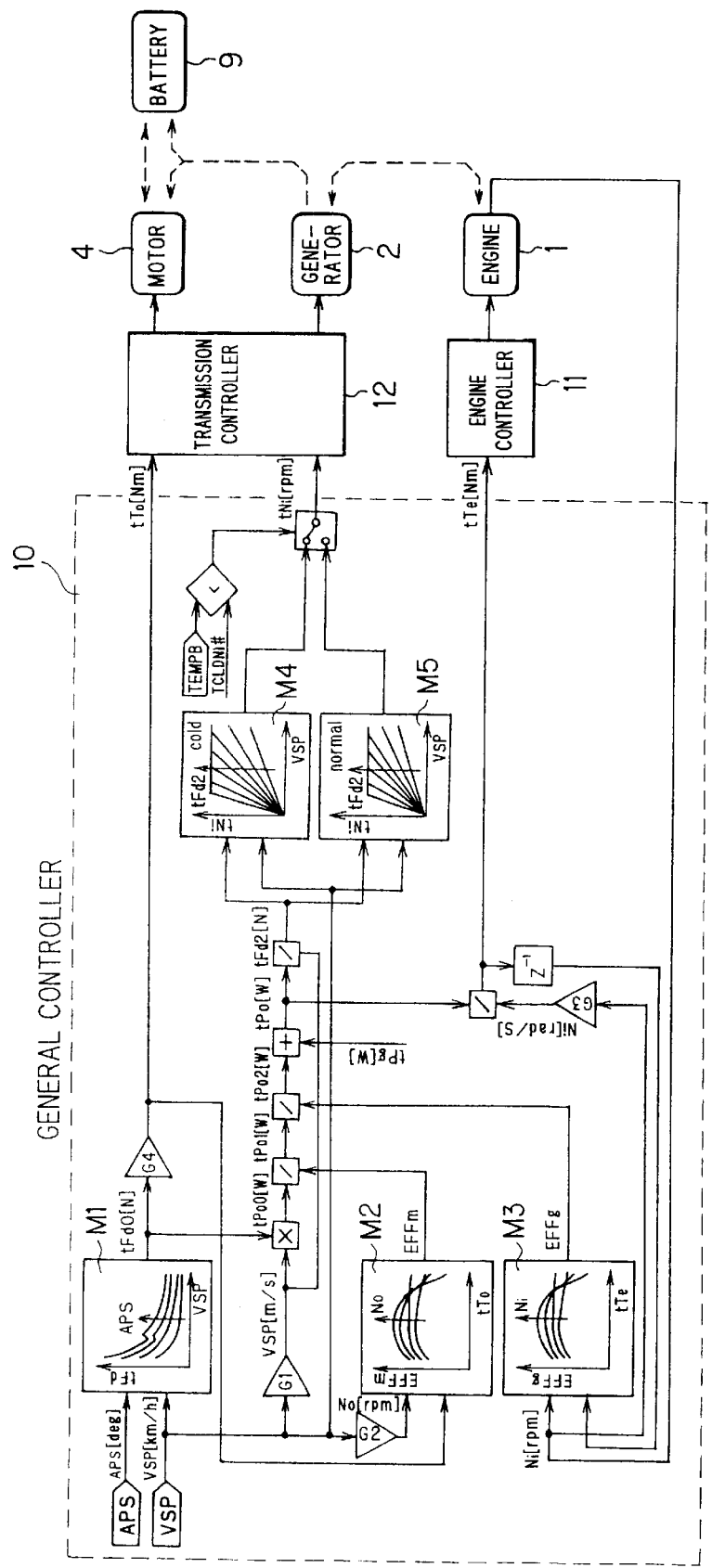
FIG. 7 is similar to FIG. 2, but showing a second embodiment of this invention.

FIG. 7 is a control block diagram of the general controller 10 relating to the second embodiment.

Here, unlike the first embodiment, the target input rotation speed tNi is computed based on a second target driving force tFd2 by looking up a map for target input rotation speed setting selected according to the battery temperature TEMPB. The second target driving force tFd2 is computed according to the efficiency of the motor 2 and the vehicle speed VSP, etc.

Two target input rotation speed setting maps (M4, M5) are provided, one for low temperature and one for ordinary temperature, one of these maps being selected according to the battery temperature TEMPB. When the battery temperature TEMPB is lower than a predetermined temperature TCLDNI# (e.g., 20° C.), the map M4 is chosen, and when it is higher than the predetermined temperature TCLDNI#, the map M5 is chosen. When the map M4 for low temperature is used, compared with the case where the map MS for ordinary temperature is used, a high target input rotation speed tNi is computed for the same target engine output tPo.

As it is necessary to ensure an engine torque margin of a magnitude which is always sufficient within the application temperature range of each map, and considering that the low temperature map M4 is used in a range from the lowest temperature TL (e.g. –30° C.) to the above-mentioned predetermined temperature TCLDNI#, the low temperature map M4 is set in view of the engine torque margin required at the lowest temperature TL due to the need for the torque margin to be larger the lower the temperature. For the same reason, the ordinary temperature map M5 is set considering the engine torque margin required at the predetermined temperature TCLDN#.

Therefore in this embodiment, sufficient margin of engine torque is ensured and generation power response of the generator 2 is enhanced when the battery temperature is low, as in the previous embodiment. Consequently, electric power shortage during sudden acceleration, etc., is always suppressed below the battery maximum power output, and power coverage from the battery 9 is ensured.

Further, according to the previous embodiment, sufficient torque margin can always be supplied according to the battery temperature, but there may be a large deviation from the original target input rotation speed when a large torque margin is required at low temperature, and the running state of the engine 1 may not satisfy the driver. In this respect, according to the second embodiment, the operating point is preset considering the torque margin and then the target input rotation speed is calculated, so an uncomfortable feeling is not imparted to the driver.

Although two maps for target input rotation speed setting are provided here, more maps may be provided and the maps changed over according to battery temperature. In this case, as the margin of engine torque can be set close to a necessary sufficient value, increase of the torque margin beyond what is needed and impairment of fuel-cost performance of the vehicle is prevented.

The entire contents of Japanese Patent Application P2000-11686 (filed Jan. 10, 2000) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed:

1. A control device for a vehicle, wherein the vehicle comprises:
   an engine;
   a generator which rotates in synchronism with the engine, and regenerates the output of the engine;
   a motor driven by the electric power regenerated by the generator, and
   an electric energy storage device which supplies electric power to the motor, wherein when the electric power supplied to the motor from the generator is insufficient due to response delay of the generation power output from the generator, the electric power to cover the insufficient amount is supplied to the motor from the electric energy storage device, and the control device comprises:
   a sensor which detects the temperature of the electric energy storage device, and
   a microprocessor programmed to enhance the response of the generation power output of the generator according to the decline of the temperature of the electric energy storage device.

2. A control device as defined in claim 1, wherein the microprocessor is further programmed to enhance the response of the generation power output of the generator by increasing the torque margin of the engine.

3. A control device as defined in claim 2, wherein the microprocessor is further programmed to increase the torque margin of the engine the lower the temperature of the electric energy storage device.

4. A control device as defined in claim 2, wherein the microprocessor is further programmed to increase the torque margin of the engine by adjusting the target rotation speed of the generator and the engine.

5. A control device as defined in claim 2, wherein the microprocessor comprises a map for computing the target rotation speed of the generator and engine set so that the engine has a predetermined torque margin, and the microprocessor is further programmed to give a predetermined torque margin to the engine by computing the target rotation speed of the generator and engine by looking up in the map.

6. A control device for a vehicle, wherein the vehicle comprises:
   an engine;
   a generator mechanically connected to the engine;
   a motor electrically connected to the generator, and mechanically connected to the drive shaft of the vehicle, and
   an electric energy storage device electrically connected to the generator and motor, and the control device comprises:
   a first sensor which detects the running conditions of the vehicle;
   a second sensor which detects the temperature of the electric energy storage device, and
   a microprocessor programmed to:
      compute a target motor output based on the running conditions of the vehicle, the target motor output expressing the output of the motor for driving the vehicle according to the running conditions,
      compute a target engine output based on the target motor output, the target engine output expressing the output of the engine for causing the generator to generate electric power according to the target motor output, compute a first target rotation speed of the generator based on the target engine output, the first target rotation speed expressing the rotation speed of the generator for making the output of the engine coincide with the target engine output at an optimum fuel cost-performance, compute a second target rotation speed of the generator based on the target engine output and the temperature of the electric energy storage device, the second target rotation speed expressing the rotation speed of the generator which makes the output of the engine coincide with the target engine output, and makes the torque margin of the engine a value according to the temperature of the electric energy storage device, select one of the first target rotation speed and second target rotation speed as a third target rotation speed, and control the rotation speed of the generator based on the third target rotation speed.

7. A control device as defined in claim 6, wherein the microprocessor is further programmed to select the larger of the first target rotation speed and second target rotation speed as the third target rotation speed.

8. A control device for a vehicle, wherein the vehicle comprises:

an engine;

a generator which rotates in synchronism with the engine, and regenerates the output of the engine;

a motor driven by the electric power regenerated by the generator, and an electric energy storage device which supplies electric power to the motor, wherein when the electric power supplied to the motor from the generator is insufficient due to response delay of the generation power output from the generator, the electric power to cover the insufficient amount is supplied to the motor from the electric energy storage device, and the control device comprises:

means for detecting the temperature of the electric energy storage device, and means for enhancing the response of the generation power output of the generator according to the decline of the temperature of the electric energy storage device.

9. A control device for a vehicle, wherein the vehicle comprises:

an engine, a generator mechanically connected to the engine;

a motor electric connected to the generator, and mechanically connected to the drive shaft of the vehicle, and an electric energy storage device electrically connected to the generator and motor, and the control device comprises:

means for detecting the running conditions of the vehicle;

means for detecting the temperature of the electric energy storage device;

means for computing a target motor output based on the running conditions of the vehicle, the target motor output expressing the output of the motor for driving the vehicle according to the running conditions;

means for computing a target engine output based on the target motor output, the target engine output expressing the output of the engine for causing the generator to generate electric power according to the target motor output;

means for computing a first target rotation speed of the generator based on the target engine output, the first target rotation speed expressing the rotation speed of the generator for making the output of the engine coincide with the target engine output at an optimum fuel cost-performance;

means for computing a second target rotation speed of the generator based on the target engine output and the temperature of the electric energy storage device, the second target rotation speed expressing the rotation speed of the generator which makes the output of the engine coincide with the target engine output, and makes the torque margin of the engine a value according to the temperature of the electric energy storage device;

means for selecting one of the first target rotation speed and second target rotation speed as a third target rotation speed, and means for controlling the rotation speed of the generator based on the third target rotation speed.

* * * * *